US010641406B2

(12) United States Patent
Rosaen et al.

(10) Patent No.: US 10,641,406 B2
(45) Date of Patent: May 5, 2020

(54) VENTURI VACUUM DRAWBACK ASSEMBLIES AND DUAL ORIFICE VENTURI VALVE ASSEMBLIES

(71) Applicant: Universal Flow Monitors, Inc., Hazel Park, MI (US)

(72) Inventors: Lars O. Rosaen, Plymouth, MI (US); Peter E. Hackett, Belleville, MI (US)

(73) Assignee: Universal Flow Monitors, Inc., Hazel Park, MI (US)

( * ) Notice: Subject to any disclaimer, the term of this patent is extended or adjusted under 35 U.S.C. 154(b) by 32 days.

(21) Appl. No.: 15/828,298

(22) Filed: Nov. 30, 2017

(65) Prior Publication Data
US 2018/0149276 A1 May 31, 2018

Related U.S. Application Data (60) Provisional application No. 62/428,089, filed on Nov. 30, 2016.

(51) Int. Cl.
*F16K 37/00* (2006.01)
*F16K 17/34* (2006.01)
(Continued)

(52) U.S. Cl.
CPC .............. *F16K 17/34* (2013.01); *B60K 11/02* (2013.01); *F16K 21/185* (2013.01);
(Continued)

(58) Field of Classification Search
CPC ....... Y10T 137/2599; Y10T 137/87177; Y10T 137/87185; F16K 17/34; F16K 21/185; F16K 37/005; B60K 11/02
(Continued)

(56) References Cited

U.S. PATENT DOCUMENTS 2,440,371 A * 4/1948 Holley, Jr. .............. F02C 7/236
417/286
2,441,483 A * 5/1948 Goehring ............ F16K 27/0263
137/597
(Continued)

FOREIGN PATENT DOCUMENTS

CN 201714511 U 1/2011
EP 0961022 A2 * 12/1999 ........... F02M 55/002

*Primary Examiner* — William M McCalister
(74) *Attorney, Agent, or Firm* — Dinsmore & Shohl LLP; Jeremy J. Justice (57) ABSTRACT

A venturi vacuum drawback assembly includes a fluid supply passage that supplies the fluid to the device, a fluid return passage that returns the fluid to the device, a shutoff valve positioned on the fluid supply passage, a bypass passage, a bypass valve positioned on the bypass passage, and a venturi valve positioned on the bypass passage downstream of the bypass valve. The bypass passage includes an inlet and an outlet. The inlet is connected to the fluid supply passage upstream of the shutoff valve, and the outlet connected to the fluid return passage. The venturi valve includes a venturi inlet, a venturi outlet, and a primary orifice positioned between the venturi inlet and the venturi outlet. The primary orifice is connected to a drawback opening on the fluid supply passage by a conduit. The drawback opening of the fluid supply passage is positioned downstream of the shutoff valve.

20 Claims, 4 Drawing Sheets (51) Int. Cl.
*B60K 11/02* (2006.01)
*F16K 21/18* (2006.01)
*F25B 45/00* (2006.01)
*F25D 17/02* (2006.01)

(52) U.S. Cl.
CPC ............ *F16K 37/005* (2013.01); *F25B 45/00* (2013.01); *F25D 17/02* (2013.01)

(58) Field of Classification Search
USPC .......................... 137/115.11, 596.12, 596.13
See application file for complete search history.

(56) References Cited

U.S. PATENT DOCUMENTS

| | | | | |
|---|---|---|---|---|
| 2,639,084 A * | 5/1953 | MacKenzie | ............... | F04F 5/42 417/197 |
| 2,746,250 A * | 5/1956 | Hawkins | ................. | B64C 25/44 60/429 |
| 2,953,147 A * | 9/1960 | Hornback | .............. | B65D 90/46 137/2 |
| 3,276,468 A * | 10/1966 | Lebow | ................... | B64D 37/00 137/491 |
| 3,370,423 A * | 2/1968 | Vaughan | ................... | F15B 7/10 60/454 |
| 3,460,566 A * | 8/1969 | Heartstedt | ............... | F16K 11/22 137/571 |
| 3,481,274 A * | 12/1969 | Napolitano | ............. | F04D 9/005 417/305 |
| 3,924,713 A * | 12/1975 | Bessiere | ................. | B60T 1/087 188/296 |
| 3,946,562 A * | 3/1976 | Ross | .................... | F15B 21/047 60/464 |
| 4,116,577 A * | 9/1978 | Lauck | ..................... | B62D 5/07 417/286 |
| 4,383,646 A * | 5/1983 | Smith | ...................... | B05B 1/14 239/14.2 |
| 4,637,351 A | 1/1987 | Pakula | | |
| 4,711,268 A * | 12/1987 | Coleman | ................. | F16K 11/22 137/597 |
| 4,744,730 A * | 5/1988 | Roeder | ................. | E21B 43/124 417/172 |
| 4,879,912 A * | 11/1989 | Suckow | .................... | G01F 1/36 73/861.61 |
| 5,032,059 A * | 7/1991 | McCall | ................... | F04F 5/461 4/541.3 |
| 5,080,560 A * | 1/1992 | LeRoy | .................... | F04F 5/466 417/172 |
| 5,556,259 A * | 9/1996 | Hlavenka | ................. | F04F 5/10 417/171 |
| 5,586,449 A * | 12/1996 | Krist | .................. | G05D 23/1919 165/288 |
| 5,647,221 A * | 7/1997 | Garris, Jr. | ................. | F04F 5/18 417/179 |
| 5,762,100 A * | 6/1998 | Wilda | ................. | G01L 19/0015 137/341 |
| 5,775,361 A * | 7/1998 | Phillips | .................. | B62D 5/062 137/115.11 |
| 5,983,869 A * | 11/1999 | Cooke | .................. | F02M 55/002 123/514 |
| 6,063,269 A * | 5/2000 | Miller | .................... | B01D 29/90 210/167.01 |
| 6,357,477 B1 * | 3/2002 | Walcott | .................. | E03B 7/074 137/599.15 |
| 6,701,953 B2 * | 3/2004 | Agosta | .................. | B01F 5/0413 137/205.5 |
| 6,932,902 B2 * | 8/2005 | Hirasawa | ............... | B01D 29/96 210/167.04 |
| 7,044,158 B1 * | 5/2006 | Huff | ..................... | F16K 37/0091 137/552 |
| 8,656,698 B1 | 2/2014 | Jansen et al. | | |
| 9,297,341 B2 | 3/2016 | VanDerWege | | |
| 9,645,068 B2 | 5/2017 | Zhang | | |
| 2004/0079411 A1* | 4/2004 | Davis | ..................... | B08B 3/026 137/115.16 |
| 2006/0140780 A1* | 6/2006 | Stark | ........................ | F04F 5/44 417/198 |
| 2010/0266424 A1* | 10/2010 | Renz | ....................... | F04F 5/463 417/191 |
| 2012/0167997 A1* | 7/2012 | Brensing | .................. | C02F 1/78 137/14 |
| 2015/0354600 A1* | 12/2015 | Fletcher | .................... | F04F 5/14 417/179 |
| 2016/0025117 A1 | 1/2016 | Engelhard et al. | | |

* cited by examiner

VENTURI VACUUM DRAWBACK ASSEMBLIES AND DUAL ORIFICE VENTURI VALVE ASSEMBLIES

CROSS-REFERENCE TO RELATED APPLICATIONS

This application claims priority to U.S. Provisional Patent Application Ser. No. 62/428,089 filed Nov. 30, 2016 which is incorporated herein by reference.

TECHNICAL FIELD

The present disclosure is directed to a venturi vacuum drawback assemblies for controlling the flow of a fluid, more particularly, venturi vacuum drawback assemblies that include a bypass passage that creates a drawback vacuum using a venturi valve.

BACKGROUND

Previously known coolant delivery systems include a coolant supply passage and a coolant return passage. The coolant supply passage runs from a supply of coolant to a device to be cooled. The coolant return passage runs from the device to be cooled to a coolant recirculating device. The coolant recirculating device removes the heat added to the coolant by the device to be cooled and then recirculates the coolant to the coolant supply.

In addition, the previously known coolant delivery systems are configured to close the coolant supply passage upon the detection of a leak. However, any coolant that remains in the coolant supply passage downstream from the closure will continue to discharge from the leak. The continuous discharge of coolant even after the closure of the coolant supply passage increases the stop work delay due to repair of the leak and clean the discharged coolant.

Accordingly, a need exists for alternative systems and methods for draining coolant that remains in a coolant delivery system downstream from a closure after leak detection.

SUMMARY

In one embodiment, a venturi vacuum drawback assemblies for controlling a flow of a fluid from a device includes a fluid supply passage, a fluid return passage, a shutoff valve, a bypass passage, a bypass valve, and a venturi valve. The fluid supply passage supplies the fluid to the device. The fluid return passage returns the fluid from the device. The shutoff valve is positioned on the fluid supply passage. The bypass passage includes an inlet and an outlet. The inlet is connected to the fluid supply passage upstream of the shutoff valve, and the outlet is connected to the fluid return passage. The bypass valve is positioned on the bypass passage. The venturi valve is positioned on the bypass passage upstream of the bypass valve. The venturi valve includes a venturi inlet, a venturi outlet, and a primary orifice positioned between the venturi inlet and the venturi outlet. The primary orifice is connected to a drawback opening on the fluid supply passage by a conduit. The drawback opening of the fluid supply passage is positioned downstream of the shutoff valve.

In another embodiment, a venturi vacuum drawback assemblies for controlling a flow of a fluid from a device includes a primary fluid supply passage, a primary fluid return passage, a primary shutoff valve, a secondary fluid supply passage, a secondary fluid return passage, a secondary shutoff valve, a bypass passage, a bypass valve, and a venturi valve. The primary fluid supply passage supplies the fluid to the device. The primary fluid return passage returns the fluid from the device. The primary shutoff valve is positioned on the primary fluid supply passage. The secondary fluid supply passage supplies the fluid to the device. The secondary fluid return passage returns the fluid from the device. The secondary shutoff valve is positioned on the secondary fluid supply passage. The bypass passage includes an inlet and an outlet. The inlet connected to the primary fluid supply passage upstream of the primary shutoff valve, and the outlet is connected to the primary fluid return passage. The bypass valve is positioned on the bypass passage. The venturi valve is positioned on the bypass passage upstream of the bypass valve. The venturi valve includes a venturi inlet, a venturi outlet, a primary orifice, and a secondary orifice. The primary orifice is positioned between the venturi inlet and the venturi outlet. The secondary orifice is positioned between the venturi inlet and the venturi outlet. The primary orifice is connected to a primary drawback opening on the primary fluid supply passage by a primary conduit. The primary drawback opening of the primary fluid supply passage is positioned downstream of the primary shutoff valve. The secondary orifice is connected to a secondary drawback opening on the secondary fluid supply passage by a secondary conduit. The secondary drawback opening of the secondary fluid supply passage is positioned downstream of the secondary shutoff valve.

In another embodiment, a dual orifice venturi valve assembly includes a venturi valve that includes a venturi inlet, a venturi outlet, a first constricted portion, and a second constricted portion. The first constricted portion and the second constricted portion are positioned between the venturi inlet and the venturi outlet. The first constricted portion includes a primary orifice and a secondary orifice. The first constricted portion includes an inlet orifice having an inlet diameter at a junction between the first constricted portion and the second constricted portion. The first constricted portion includes an outlet orifice having an outlet diameter greater than the inlet diameter. An area of the outlet orifice is equal to or less than a sum of an area of the inlet orifice, an area of the primary orifice, and an area of the secondary orifice diameter.

These and additional features provided by the embodiments described herein will be fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Venturi vacuum drawback assemblies of the present disclosure include a fluid supply passage, a fluid return passage, a shutoff valve, a bypass passage, a bypass valve, and a venturi valve. The fluid supply passage supplies the fluid to a device. The fluid return passage returns the fluid from the device. The shutoff valve is positioned on the fluid supply passage. The bypass passage includes an inlet and an outlet. The inlet is connected to the fluid supply passage upstream of the shutoff valve, and the outlet connected to the fluid return passage. The bypass valve is positioned on the bypass passage. The venturi valve is positioned on the bypass passage upstream of the bypass valve. The venturi valve includes a venturi inlet, a venturi outlet, and a primary orifice positioned between the venturi inlet and the venturi outlet. The primary orifice is connected to a drawback opening on the fluid supply passage by a conduit. The drawback opening of the fluid supply passage is positioned downstream of the shutoff valve.

Upon movement of the shutoff valve from a normally open position to a closed position and movement of the bypass valve from a normally closed position to an open position, fluid is inhibited from flowing through the shutoff valve to the device and fluid is permitted to flow through the bypass passage including the venturi valve. The flow of fluid through the venturi valve creates a vacuum at the primary orifice which draws back fluid contained in the fluid supply passage downstream of the shutoff valve. The fluid in the fluid supply passage downstream of the shutoff valve is drawn through the conduit into the venturi valve of the bypass passage so as to exit the bypass passage and into the fluid return passage.

Figure 1:
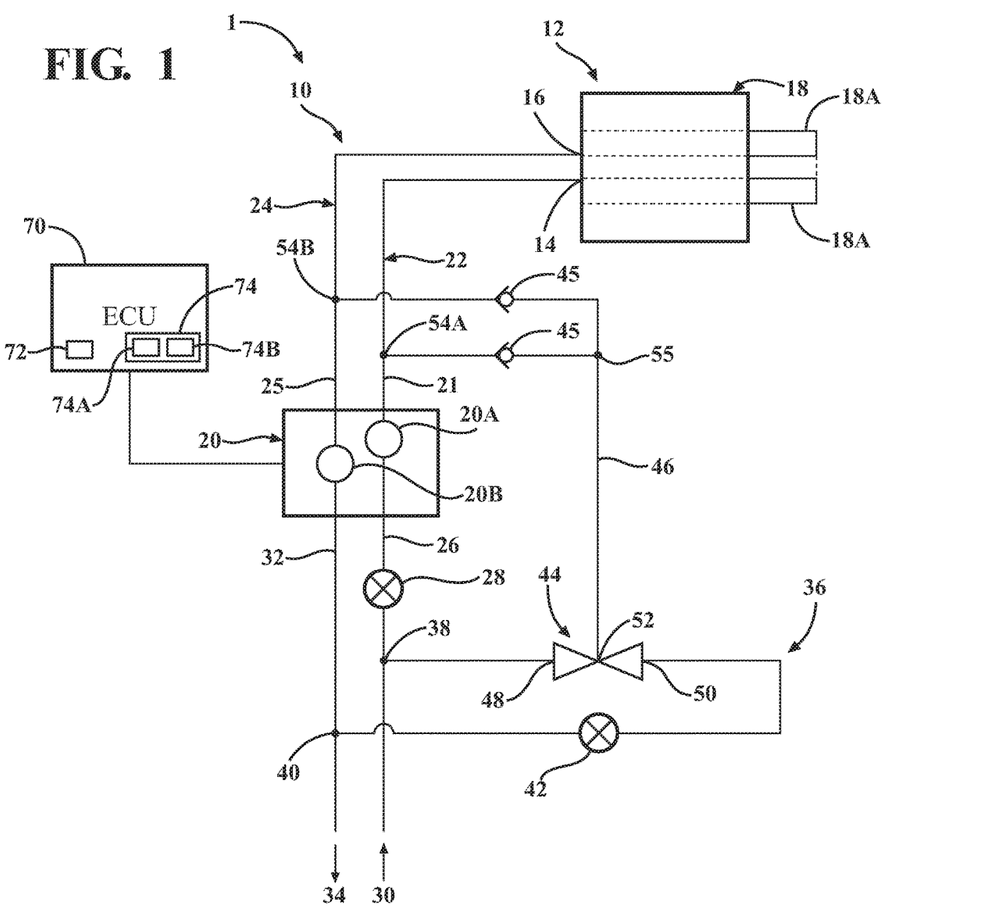
FIG. 1 schematically depicts a venturi vacuum drawback assembly for controlling a flow of a fluid from a device, according to one or more embodiments shown and described herein.

FIG. 1 generally depicts a coolant delivery system 1 to which a venturi vacuum drawback assembly 10 is applied. The coolant delivery system 1 includes a device 12 to be cooled by a fluid, for example a coolant. In the illustrated embodiment, the device 12 includes a device inlet 14, a device outlet 16, and a cooling part 18. Fluid flows into the device inlet 14 to cool the cooling part 18 and the fluid, heated by the cooling part 18, exits through the device outlet 16. In some embodiments, the cooling part 18 includes a pair of cooling parts 18A. In the illustrated embodiment, the device 12 is a robotic welding device and the cooling parts 18A are a pair of weld tips 18A of the robotic welding device.

Referring to FIG. 1, the venturi vacuum drawback assembly 10 includes a fluid supply 30, a fluid supply passage 22, a fluid return 34, and a fluid return passage 24. The device inlet 14 is connected to a fluid supply 30 by the fluid supply passage 22. The device outlet 16 is connected to the fluid return 34 by the fluid return passage 24. In some embodiments, the fluid return 34 includes a coolant recirculating device (not shown). The coolant recirculating device, such as refrigerator, removes the heat added to the coolant by the device 12 to be cooled, and then recirculates the coolant to the fluid supply 30.

The venturi vacuum drawback assembly 10 may also include a flowmeter unit 20 that is provided on at least one of the fluid supply passage 22 and the fluid return passage 24. The flowmeter unit 20 includes a supply outlet 21 and a supply inlet 26 on the fluid supply passage 22. The supply outlet 21 connects to the device inlet 14 of the device 12 by the fluid supply passage 22 downstream of the flowmeter unit 20. The supply inlet 26 connects to the fluid supply 30 upstream of the flowmeter unit 20. The flowmeter unit 20 includes a return inlet 25 and a return outlet 32 on the fluid return passage 24. The return inlet 25 connects to the device outlet 16 of the device 12 through the fluid return passage 24 upstream of the flowmeter unit 20. The return outlet 32 connects to the fluid return 34 through the fluid return passage 24 downstream of the flowmeter unit 20. As described in greater detail below, the flowmeter unit 20 detects leaks from cap loss, hose burst, or inadvertent shutoff and outputs a leak signal upon the detection of a leak.

The venturi vacuum drawback assembly 10 may also include a shutoff valve 28 that is positioned on the fluid supply passage 22 upstream of the flowmeter unit 20. Specifically, the shutoff valve 28 is provided on the fluid supply passage 22 upstream of the supply inlet 26. The shutoff valve 28 is switchable between a normally open position and a closed position. In the open position, the shutoff valve 28 allows coolant from the fluid supply 30 to flow into the supply inlet 26. In the closed position, the shutoff valve 28 inhibits fluid flowing from the fluid supply 30 through the shutoff valve 28 to the supply inlet 26.

The venturi vacuum drawback assembly 10 also includes a bypass passage 36, a bypass valve 42, a venturi valve 44, and a conduit 46 that connects the venturi valve 44 to the fluid supply passage 22 downstream of the shutoff valve 28. The bypass passage 36 includes a bypass inlet 38 and a bypass outlet 40. The bypass inlet 38 is positioned on the fluid supply passage 22 upstream of the shutoff valve 28. The bypass outlet 40 is positioned on the fluid return passage 24 downstream of the return outlet 32.

The bypass valve 42 is switchable between a normally closed position and an open position. In the closed position, the bypass valve 42 inhibits fluid from passing through the bypass passage 36. In the open position, the bypass valve 42 allows fluid to flow through the bypass passage 36 to bypass the device 12. Specifically, the fluid that flows through the bypass passage 36 bypasses the supply inlet 26, the flowmeter unit 20, the supply outlet 21, the device inlet 14, the device 12, the cooling part 18, the device outlet 16, the return inlet 25, the flowmeter unit 20, and the return outlet 32 so as to enter the fluid return passage 24.

The venturi valve 44 is positioned on the bypass passage 36 between the bypass inlet 38 and the bypass valve 42. The venturi valve 44 includes a venturi inlet 48, a venturi outlet 50, and a primary orifice 52 positioned between the venturi inlet 48 and the venturi outlet 50.

A drawback opening 54A is provided on the fluid supply passage 22 downstream of the flowmeter unit 20. Specifically, the drawback opening 54A is positioned on the fluid supply passage 22 between the supply outlet 21 and the device inlet 14. The conduit 46 connects the primary orifice 52 to the drawback opening 54A In some embodiments, a check valve 45 is positioned between the drawback opening 54A and the primary orifice 52 of the venturi valve 44.

In some embodiments, a drawback opening 54B is provided on the fluid return passage 24 upstream of the flowmeter unit 20. Specifically, the drawback opening 54B is positioned on the fluid return passage 24 between the return inlet 25 and the device outlet 16. In some embodiments, the conduit 46 includes a junction 55 that splits the conduit 46 to connect the primary orifice 52 to at least one of the drawback opening 54A and the drawback opening 54B. The junction 55 splits the conduit 46 to connect the primary orifice 52 to both the drawback opening 54A and the drawback opening 54B. A check valve 45 is positioned between the junction 55 and the primary orifice 52 of the venturi valve 44 so as to prevent fluid from flowing from the primary orifice 52 of the venturi valve 44 to the drawback opening 54A and 54B. In some other embodiments, the check valve 45 is positioned between the junction 55 and the drawback opening 54A and a check valve 45 is positioned between the junction 55 and the drawback opening 54B.

Figure 2:
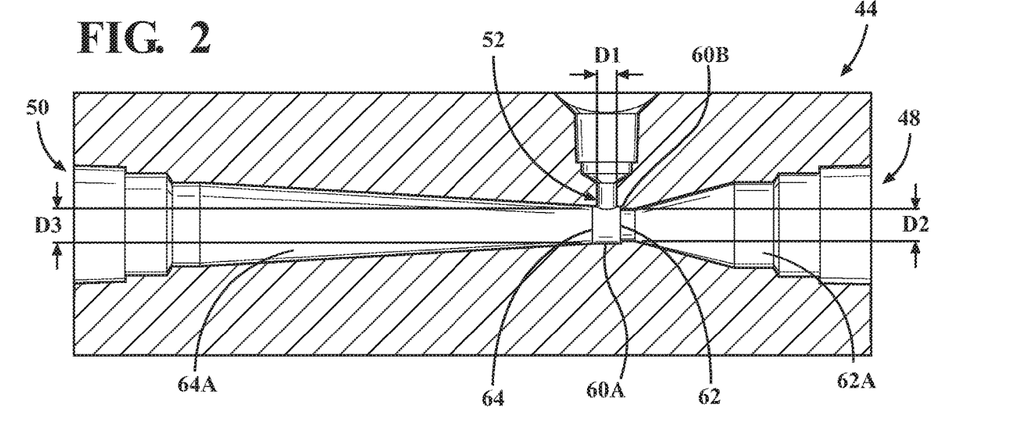
FIG. 2 schematically depicts a partial cross-sectional view of a venturi valve of the venturi vacuum drawback assemblies of FIG. 1, according to one or more embodiments shown and described herein.

Referring to FIG. 2, the venturi valve 44 includes a first constricted portion 60A and a second constricted portion 60B. The first constricted portion 60A includes an inlet orifice 62 and an outlet orifice 64. The primary orifice 52 is positioned at the first constricted portion 60A between the inlet orifice 62 and the outlet orifice 64. As such, the inlet orifice 62 is the opening of the first constricted portion 60A that is in communication with the second constricted portion 60B. The second constricted portion 60B is in communication with the venturi inlet 48. The outlet orifice 64 is the opening of the first constricted portion 60A that is in communication with the venturi outlet 50.

In some embodiments, the venturi valve 44 includes an inlet passage 62A and an outlet passage 64A. The inlet passage 62A extends between second constricted portion 60B and the venturi inlet 48. The outlet passage 64A extends between the outlet orifice 64 and the venturi outlet 50.

The primary orifice 52 includes a diameter D1 at the first constricted portion 60A. The inlet orifice 62 includes a diameter D2 at the junction between the first constricted portion 60A and the second constricted portion 60B. The outlet orifice 64 includes a diameter D3 at the first constricted portion 60A. The inlet orifice 62 is the junction of the first constricted portion 60A and the second constricted portion 60B where the diameter D2 changes from to the diameter D3. In some embodiments, the first constricted portion 60A includes the diameter D3 and the second constricted portion 60B includes the diameter D2.

In some embodiments, the diameter D3 of the outlet orifice 64, the diameter D1 of the primary orifice 52, and the diameter D2 of the inlet orifice 62 are dimensioned such that an area of outlet orifice 64 is equal to a sum of an area of the primary orifice 52 and an area of the inlet orifice 62. As such, a velocity of the fluid flowing through the inlet orifice 62 is substantially equal to a velocity of the fluid flowing through the primary orifice 52 which is substantially equal to a velocity of the fluid flowing through the outlet orifice 64.

In some other embodiments, the diameter D3 of the outlet orifice 64, the diameter D1 of the primary orifice 52, and the diameter D2 of the inlet orifice 62 are dimensioned such that the area of outlet orifice 64 is less than the sum of the area of the primary orifice 52 and the area of the inlet orifice 62. For example, the area of the outlet orifice 64 is less than the sum of the area of the primary orifice 52 and the area of the inlet orifice 62 by at least 0.1%, such as at least 1%, such as at least 5%, such as at least 10%.

In some embodiments, the first constricted portion 60A is generally cylindrically shaped having the diameter D3, and the second constricted portion 60B is generally cylindrical shaped having the diameter D2. As such, the inlet orifice 62 at the junction of the first constricted portion 60A and the second constricted portion 60B has the diameter D2 and the outlet orifice 64 has the diameter D3 that is less than the inlet diameter D2.

In some embodiments, the first constricted portion 60A and the second constricted portion 60B constrict the diameter of the venturi valve 44 so as to reduce a pressure as the fluid flows through the second constricted portion 60B and then the first constricted portion 60A which creates a vacuum at the primary orifice 52 located in the first constricted portion. In some embodiments, the first constricted portion 60A and the second constricted portion 60B are dimensioned such that an area of the outlet orifice 64 is equal to or less than a sum of an area of the inlet orifice 62 and an area of the primary orifice 52.

Referring to FIG. 1, the flowmeter unit 20 is configured to detect differences in flow between the fluid flowing through the fluid supply passage 22 and the fluid return passage 24. Specifically, a supply flowmeter 20A is provided between the supply outlet 21 and a supply inlet 26 and a return flowmeter 20B is provided between the return inlet 25 and the return outlet 32. The flowmeter unit includes an electronic control unit 70.

Examples of a flowmeter unit 20 that may be used in the disclosed venturi vacuum drawback assembly 110 include, but are not limited to, the Delta Point®, Ethernet Delta Point®, 24V DC Delta Point®, 120V AC Delta Point®, and DeviceNet Delta Point®, sold by Rocon LLC of Hazel Park, Mich. It will be appreciated, of course, that other flowmeter units may also be used in conjunction with the venturi vacuum drawback assembly 10.

The electronic control unit 70 is electronically connected to the shutoff valve 28 and the bypass valve 42. Specifically, the electronic control unit 70 is configured to control the operation of the shutoff valve 28 between the normally open position and the closed position. The electronic control unit 70 is further configured to control the operation of the bypass valve 42 between the normally closed position and the open position. In some embodiments, the shutoff valve 28 and the bypass valve 42 are electronically controlled solenoid valves that are controlled by the electronic control unit 70.

In some embodiments, the electronic control unit 70 includes a processor 72 and a memory component 74 coupled to the processor 72. The processor 72 is a central processing unit (CPU). The processor 72 includes processing components operable to receive and execute instructions from the memory component 74. The memory component 74 stores detection logic 74A and control logic 74B. The detection logic 74A and the control logic 74B may each include a plurality of different pieces of logic, each of which may be embodied as a computer program, firmware, and/or software/hardware.

In some embodiments, the memory component 74 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the electronic control unit 70 and/or external to the electronic control unit 70 and the flowmeter unit 20.

The detection logic 74A is executable by the processor 72 to detect one or more signals output from the supply flowmeter 20A and the return flowmeter 20B. For example, the detection logic 74A is configured to cause the processor 72 to determine a presence or absence of a leak in the coolant delivery system 1, specifically, a leak in at least one of the fluid supply passage 22, the device 12, including device inlet 14 and the device outlet 16, and the fluid return passage 24 based on the signals output from at least one of the supply flowmeter 20A and the return flowmeter 20B. Specifically, processor 72 determines the presence or absence of the leak based on output signals from the supply flowmeter 20A and the return flowmeter 20B that indicate the flowrates of the fluid supply passage 22 and the fluid return passage 24, respectively.

The control logic 74B is executed by the processor 72 to control operation of the shutoff valve 28 and the bypass valve 42 based on the determination of the presence or absence of a leak in the coolant delivery system 1 by the processor 72. In some embodiments, when the processor 72 has determined the absence of a leak, the control logic 74B is executed by the processor 72 to control the shutoff valve 28 into the normally open position and the control logic 74B controls the bypass valve 42 in the normally closed position.

In order to facilitate a better understanding of the venturi vacuum drawback assembly 10, a discussion of the operation of the venturi vacuum drawback assembly 110 will be provided. During operation in which the processor 72 determines the absence of a leak, the coolant delivery system 1 operates to deliver fluid from the fluid supply 30 to the device 12 through the fluid supply passage 22 and returns the fluid from the device 12 through the fluid return passage 24 to the recirculation device connected to the fluid return 34. Specifically, during such operation, the shutoff valve 28 is in the normally open position and the bypass valve 42 is in the normally closed position. As fluid flows through the fluid supply passage 22, the fluid is prevented from flowing through the bypass passage 36 as the bypass valve 42 is in the normally closed position.

During operation in which the processor 72 determines the presence of a leak, the venturi vacuum drawback assembly 10 operates to control the flow of fluid from the device 12. Specifically, upon the processor 72 determining the presence of a leak based on the one or more signals output from the supply flowmeter 20A and the return flowmeter 20B and detected by the detection logic 74A, the control logic 74B is executed by the processor 72 to control the shutoff valve 28 from the normally open position to the closed position and to control the bypass valve 42 from the normally closed position to the open position.

In some embodiments, the processor 72 executes the control logic 74B to switch the bypass valve 42 from the normally closed position to the open position simultaneously with the switching of the shutoff valve 28 from the normally open position to the closed position. In some embodiments, the processor 72 executes the control logic 74B to switch the bypass valve 42 from the normally closed position to the open position after an elapse of a preset time period after switching of the shutoff valve 28 from the normally open position to the closed position.

In the closed position, the shutoff valve 28 prevents fluid from flowing from the fluid supply 30 through the shutoff valve 28 to the device 12. As fluid is prevented from flowing in the fluid supply passage 22, downstream of the shutoff valve 28, additional fluid is prevented from being discharged through the leak. As the bypass valve 42 is in the open position, fluid is permitted to flow through the bypass passage 36 from the bypass inlet 38 on the fluid supply passage 22 upstream of the shutoff valve 28 to the bypass outlet 40 on the fluid return passage 24 downstream of the return outlet 32.

As such, fluid flows through the bypass passage 36 including the venturi valve 44. Due to the venturi effect of the venturi valve 44, a pressure in the venturi valve 44 upstream of the primary orifice 52 is higher than the pressure downstream of the primary orifice 52 due to the change in cross-sectional area at the first constricted portion 60A and the second constricted portion 60B. Accordingly, the fluid remaining in the fluid supply passage 22 downstream of the shutoff valve 28 is at a higher pressure than the pressure at the primary orifice 52 and the fluid moves from the area of high pressure to the area of low pressure to drain the fluid that remains in the fluid supply passage 22 through the venturi valve 44 so as to exit through the fluid return passage 24. Similarly, the fluid remaining in the fluid return passage 24 upstream of the flowmeter is at a higher pressure than the pressure at the primary orifice 52 and the fluid moves from the area of high pressure to the area of low pressure to drain the fluid that remains in the fluid return passage 24 through the venturi valve 44 so as to exit through the fluid return passage 24.

As such, the decrease in pressure creates a vacuum at the primary orifice 52 allowing the fluid that remains in the fluid supply passage 22 downstream of the shutoff valve 28 to be drawn through drawback opening 54A and into the primary orifice 52 via the conduit 46. Fluid drawn through the primary orifice 52 exits the venturi valve 44 via the venturi outlet 50 and enters the fluid return passage 24 via the bypass outlet 40. Therefore, the remaining fluid in the fluid supply passage 22 downstream of the shutoff valve 28 will not discharge through the leak due to the vacuum effect of the venturi valve 44.

Similarly, the decrease in pressure creates a vacuum at the primary orifice 52 allowing the fluid that remains in the fluid return passage 24 downstream of the device 12 to be drawn through drawback opening 54B and into the primary orifice 52 via the conduit 46. Fluid drawn through the primary orifice 52 exits the venturi valve 44 via the venturi outlet 50 and enters the fluid return passage 24 via the bypass outlet 40. Therefore, the remaining fluid in the fluid return passage 24 downstream of the device 12 will not discharge through the leak due to the vacuum effect of the venturi valve 44.

In some embodiments, the venturi valve 44 not only draws back the fluid in the fluid supply passage 22 that is upstream and/or downstream of the leak and draws back the fluid in the fluid return passage 24 that is upstream and/or downstream of the leak.

Figure 3:
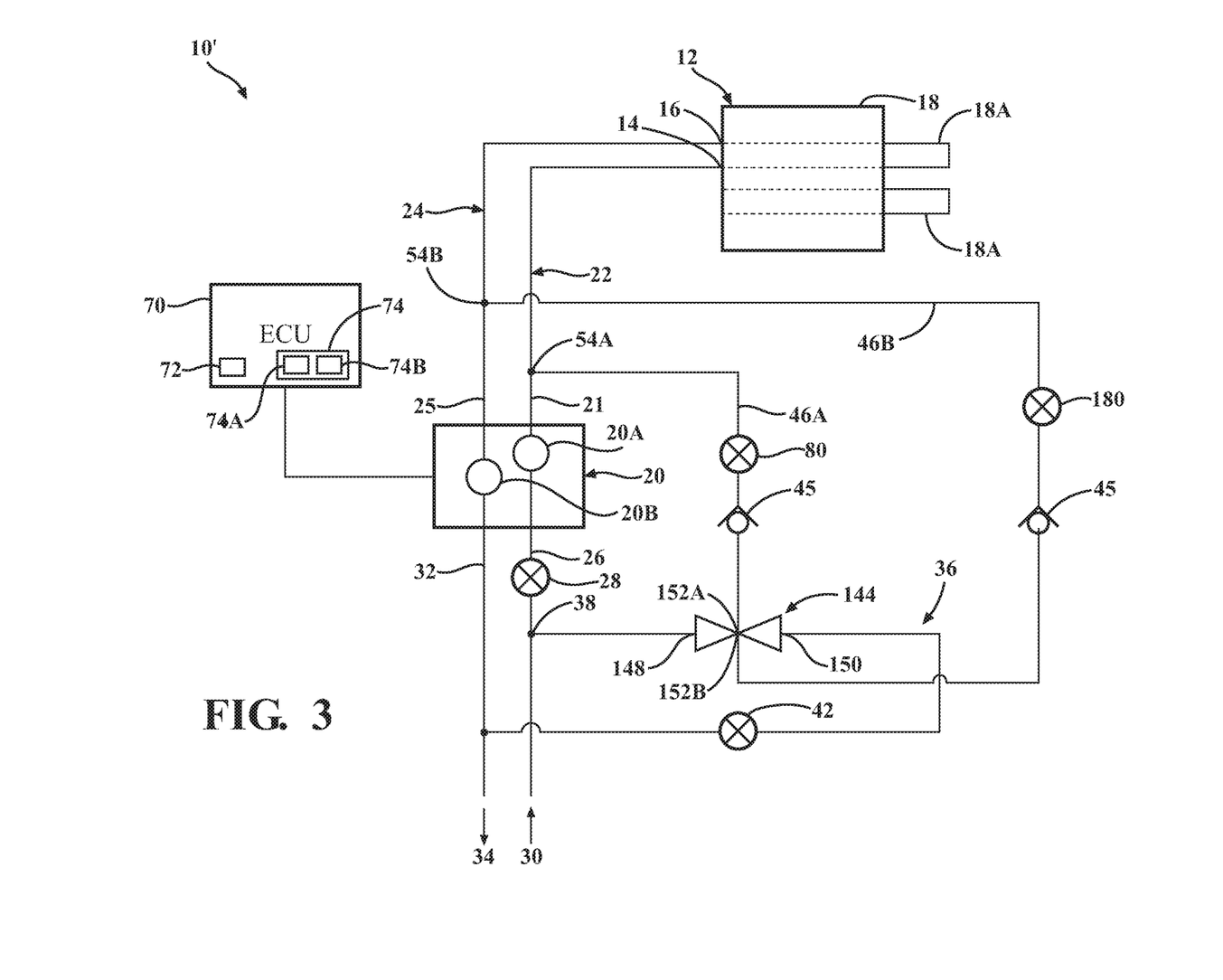
FIG. 3 schematically depicts a venturi vacuum drawback assembly for controlling the flow of the fluid from the device, according to one or more embodiments shown and described herein.

Referring to FIG. 3, a venturi vacuum drawback assembly is generally illustrated at 10'. The venturi vacuum drawback assembly 10' is similar to the venturi vacuum drawback assembly 10 except that the venturi vacuum drawback assembly 10 includes a dual orifice venturi valve 144, a supply conduit 46A and a return conduit 46B.

The dual orifice venturi valve 144 is positioned on the bypass passage 36 between the bypass inlet 38 and the bypass valve 42. The dual orifice venturi valve 144 includes a venturi inlet 148, a venturi outlet 150, a primary orifice 152A, and a secondary orifice 152B. The primary orifice 152A and the secondary orifice 152B are positioned between the venturi inlet 148 and the venturi outlet 150. The primary orifice 152A is connected to the drawback opening 54A by the supply conduit 46A and the secondary orifice 152B is connected to the drawback opening 54B by the return conduit 46B. In some embodiments, a check valve 45 is positioned on the supply conduit 46A between the primary orifice 152A and the drawback opening 54A and a check valve 45 is positioned on the return conduit 46B between the secondary orifice 152B and the drawback opening 54B.

Figure 4A:
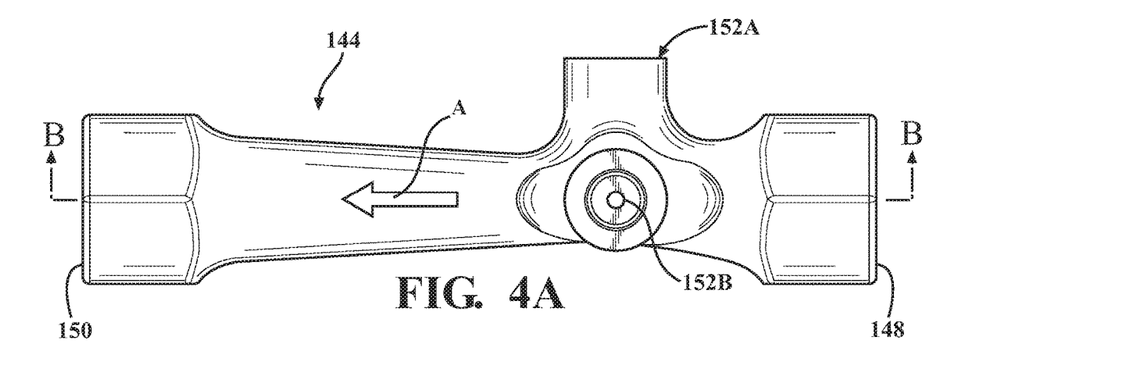
FIG. 4A schematically depicts a partial side view of a venturi valve of the venturi vacuum drawback assembly of FIG. 3, according to one or more embodiments shown and described herein FIG. 4B schematically depicts a partial cross-sectional view of the venturi valve of the venturi vacuum drawback assembly taken along the lines B-B of FIG. 4A, according to one or more embodiments shown and described herein.
Figure 4B:
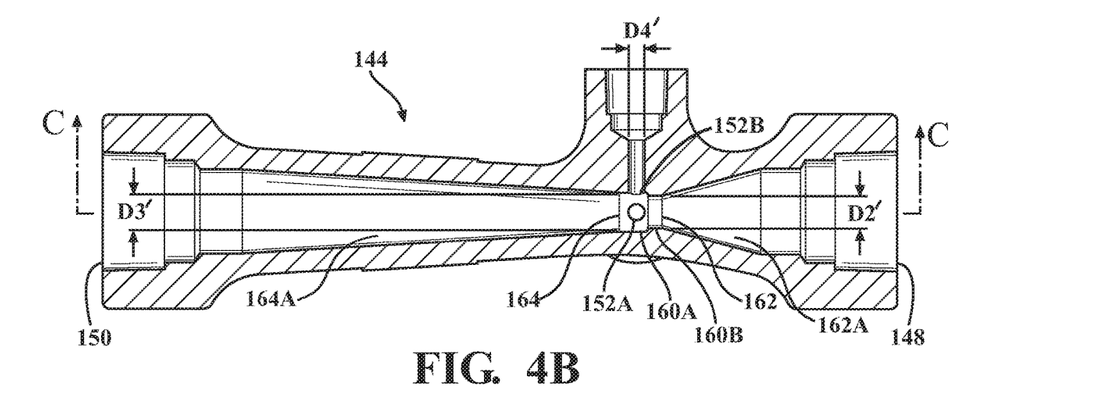
Figure 4C:
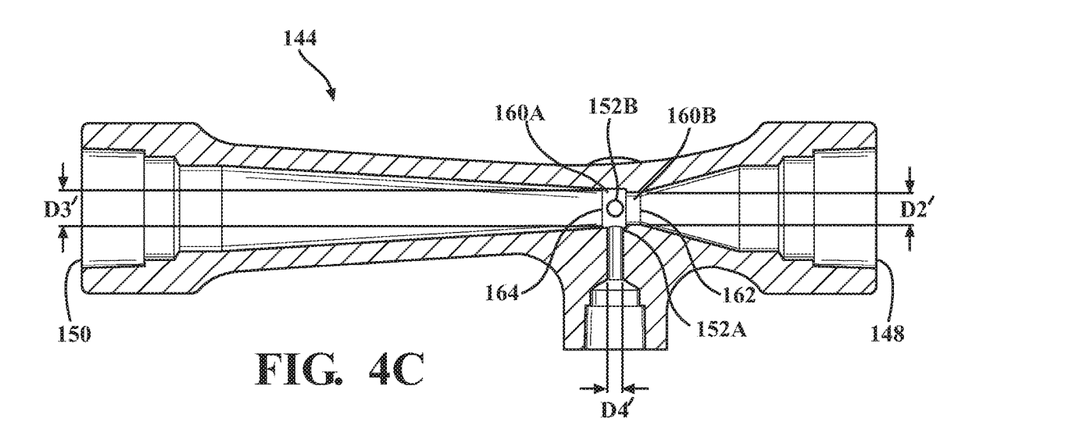
FIG. 4C schematically depicts a partial cross-sectional view of a venturi valve of the venturi vacuum drawback assembly taken along the lines C-C of FIG. 4B, according to one or more embodiments shown and described herein.

Referring to FIGS. 4A, 4B, and 4C, the dual orifice venturi valve 144 includes a first constricted portion 160A and a second constricted portion 160B. The first constricted portion 160A includes an inlet orifice 162 and an outlet orifice 164. The primary orifice 152A and the secondary orifice 152B are positioned at the first constricted portion 160A between the inlet orifice 162 and the outlet orifice 164. The inlet orifice 162 is the junction of the first constricted portion 160A and the second constricted portion 60B. As such, the inlet orifice 162 is the opening of the first constricted portion 160A that is in communication with the second constricted portion 160B. The second constricted portion 60B is in communication with the venturi inlet 148. The outlet orifice 164 is the opening of the first constricted portion 160A that is in communication with the venturi outlet 150.

In some embodiments, the dual orifice venturi valve 144 includes an inlet passage 162A and an outlet passage 164A. The inlet passage 162A extends between the second constricted portion 160B and the venturi inlet 148. The outlet passage 164A extends between the outlet orifice 164 and the venturi outlet 150.

Referring to FIG. 4B, the primary orifice 152A includes a diameter D1' at the first constricted portion 160A. Referring to FIG. 4C, the secondary orifice 152B includes a diameter D4' at the first constricted portion 160A. Referring to FIGS. 4B, and 4C, the inlet orifice 162 includes a diameter D2' at the first constricted portion 160A. The outlet orifice 164 includes a diameter D3' that is greater than the inlet diameter D2'. As such, the inlet orifice 162 is the junction of the first constricted portion 160A and the second constricted portion 160B where the diameter D2 changes from to the diameter D3. The inlet orifice 162 is the opening of the first constricted portion 160A that is in communication with the second constricted portion 160B. The second constricted portion 160B is in communication with the venturi inlet 148. The outlet orifice 164 is the opening of the first constricted portion 160A that is in communication with the venturi outlet 150.

In some embodiments, the dual orifice venturi valve 144 includes an inlet passage 162A and an outlet passage 164A. The inlet passage 162A extends between second constricted portion 160B and the venturi inlet 148. The outlet passage 164A extends between the outlet orifice 164 and the venturi outlet 150.

In some embodiments, the diameter D3' of the outlet orifice 164, the diameter D1' of the primary orifice 152A, the diameter D4' of the secondary orifice 152B, and the diameter D2' of the inlet orifice 62 are dimensioned such that an area of outlet orifice 164 is equal to a sum of an area of the primary orifice 152A, the secondary orifice 152B, and an area of the inlet orifice 162.

In some embodiments, the diameter D3' of the outlet orifice 164, the diameter D1' of the primary orifice 152A, the diameter D4' of the secondary orifice 152B, and the diameter D2' of the inlet orifice 62 are dimensioned such that the area of outlet orifice 164 is less than the sum of the area of the primary orifice 152A, the secondary orifice 152B, and the area of the inlet orifice 162. For example, the area of the outlet orifice 164 is less than the sum of the area of the primary orifice 152A, the area of the secondary orifice 152B, and the area of the inlet orifice 62 by at least 0.1%, such as at least 1%, such as at least 5%, such as at least 10%.

As such, a velocity of the fluid flowing through the inlet orifice 162 is substantially equal to a velocity of the fluid flowing through the primary orifice 152A and the velocity of the fluid flowing through the secondary orifice 52B which is substantially equal to a velocity of the fluid flowing through the outlet orifice 164.

In some embodiments, the first constricted portion 160A is generally cylindrically shaped having the diameter D3', and the second constricted portion 160B is generally cylindrically shaped having the diameter D2'. As such, the inlet orifice 162, at the junction between the first constricted portion 160A and the second constricted portion 160B, has the diameter D2' and the outlet orifice 164 has the diameter D3'.

In some embodiments, the first constricted portion 160A and the second constricted portion constrict the diameter of the dual orifice venturi valve 144 so as to reduce a pressure which creates a vacuum at the primary orifice 152A and the secondary orifice 152B. In some embodiments, the first constricted portion 160A and the second constricted portion 160B are dimensioned such that an area of the outlet orifice 164 is equal to or less than a sum of an area of the primary orifice 152A, an area of the secondary orifice 152B, and an area of the inlet orifice 162.

Referring to FIGS. 4A, 4B, and 4C, fluid flows through the dual orifice venturi valve 144 in a flow direction A from the venturi inlet 148 towards the venturi outlet 150. In some embodiments, the dual orifice venturi valve 144 is oriented such fluid flows through the primary orifice 152A in a first direction A1 and fluid flows through the secondary orifice 152B in a second direction A2. The first direction A1 is generally perpendicular to the flow direction A and the second direction A2 is generally perpendicular to the flow direction A. The first direction A1 is also generally perpendicular to the second direction A2.

In order to facilitate a better understanding of the venturi vacuum drawback assembly 10', a discussion of the operation of the venturi vacuum drawback assembly 10' will be provided. During operation in which the processor 72 determines the absence of a leak, the coolant delivery system 1 operates to deliver fluid from the fluid supply 30 to the device 12 through the fluid supply passage 22 and returns the fluid from the device 12 through the fluid return passage 24 to the recirculation device connected to the fluid return 34. Specifically, during such operation, the shutoff valve 28 is in the normally open position and the bypass valve 42 is in the normally closed position. As fluid flows through the fluid supply passage 22, the fluid is prevented from flowing through the bypass passage 36 as the bypass valve 42 is in the normally closed position.

During operation in which the processor 72 determines the presence of a leak, the venturi vacuum drawback assembly 10 operates to control the flow of fluid from the device 12. Specifically, upon the processor 72 determining the presence of a leak based on the one or more signals output from the supply flowmeter 20A and the return flowmeter 20B and detected by the detection logic 74A, the control logic 74B is executed by the processor 72 to control the shutoff valve 28 from the normally open position to the closed position and to control the bypass valve 42 from the normally closed position to the open position.

In some embodiments, the processor 72 executes the control logic 74B to switch the bypass valve 42 from the normally closed position to the open position simultaneously with the switching of the shutoff valve 28 from the normally open position to the closed position. In some embodiments, the processor 72 executes the control logic 74B to switch the bypass valve 42 from the normally closed position to the open position after an elapse of a preset time period after switching of the shutoff valve 28 from the normally open position to the closed position.

In the closed position, the shutoff valve 28 prevents fluid from flowing from the fluid supply 30 through the shutoff valve 28 to the device 12. As fluid is prevented from flowing in the fluid supply passage 22, downstream of the shutoff valve 28, additional fluid is prevented from being discharged through the leak. As the bypass valve 42 is in the open position, fluid is permitted to flow through the bypass passage 36 from the bypass inlet 38 on the fluid supply passage 22 upstream of the shutoff valve 28 to the bypass outlet 40 on the fluid return passage 24 downstream of the return outlet 32.

As such, fluid flows through the bypass passage 36 including the dual orifice venturi valve 144. Due to the venturi effect of the dual orifice venturi valve 144, a pressure in the dual orifice venturi valve 144 upstream of the primary orifice 152A and the secondary orifice 152B is higher than the pressure downstream of the primary orifice 152A due to the change in cross-sectional area at the first constricted portion 160A and the second constricted portion 160B. Accordingly, the fluid remaining in the fluid supply passage 22 downstream of the shutoff valve 28 is at a higher pressure than the pressure at the primary orifice 152A and the fluid moves from the area of high pressure to the area of low pressure to drain the fluid that remains in the fluid supply passage 22 through the dual orifice venturi valve 144 so as to exit through the fluid return passage 24. Similarly, the fluid remaining in the fluid return passage 24 upstream of the flowmeter 20 is at a higher pressure than the pressure at the secondary orifice 152B and the fluid moves from the area of high pressure to the area of low pressure to drain the fluid that remains in the fluid return passage 24 through the dual orifice venturi valve 144 so as to exit through the fluid return passage 24.

As such, the decrease in pressure creates a vacuum at the primary orifice 152A allowing the fluid that remains in the fluid supply passage 22 downstream of the shutoff valve 28 to be drawn through drawback opening 54A and into the primary orifice 52 via the supply conduit 46A. Fluid drawn through the primary orifice 52 exits the dual orifice venturi valve 144 via the venturi outlet 50 and enters the fluid return passage 24 via the bypass outlet 40. Therefore, the remaining fluid in the fluid supply passage 22 downstream of the shutoff valve 28 will not discharge through the leak due to the vacuum effect of the venturi valve 44.

Similarly, the decrease in pressure creates a vacuum at the secondary orifice 152B allowing the fluid that remains in the fluid return passage 24 downstream of the device 12 to be drawn through drawback opening 54B and into the secondary orifice 152B via the return conduit 46B. Fluid drawn through the secondary orifice 152B exits the dual orifice venturi valve 144 via the venturi outlet 50 and enters the fluid return passage 24 via the bypass outlet 40. Therefore, the remaining fluid in the fluid return passage 24 downstream of the device 12 will not discharge through the leak due to the vacuum effect of the venturi valve 44.

In some embodiments, the dual orifice venturi valve 144 not only draws back the fluid in the fluid supply passage 22 that is upstream and/or downstream of the leak and draws back the fluid in the fluid return passage 24 that is upstream and/or downstream of the leak.

Figure 5:
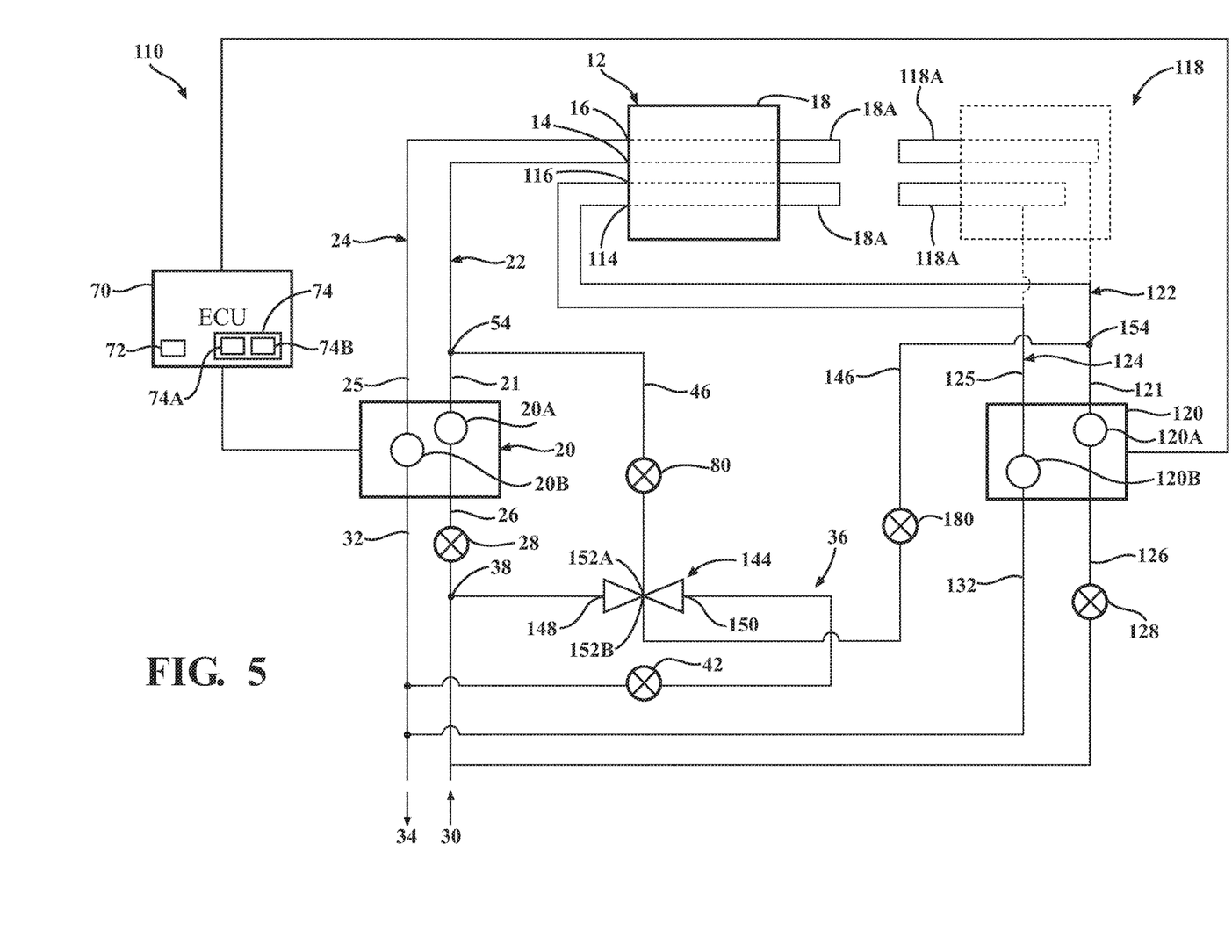
FIG. 5 schematically depicts a venturi vacuum drawback assembly for controlling a flow of a fluid from a device, according to one or more embodiments shown and described herein.

Referring to FIG. 5, a venturi vacuum drawback assembly is generally illustrated at 110. The venturi vacuum drawback assembly 110 is similar to the venturi vacuum drawback assembly 10' except that the venturi vacuum drawback assembly 110 includes a secondary fluid supply passage 122, a secondary fluid return passage 124, a secondary flowmeter unit 120, a secondary shutoff valve 128, and secondary conduit 146.

In some embodiments, the secondary fluid supply passage 122 extends from the fluid supply passage 22, upstream of the flowmeter unit 20, the shutoff valve 28 and the bypass inlet 38, to a secondary device inlet 114 of the device 12. The secondary fluid return passage 124 extends from a secondary device outlet 116 of the device 12 to the fluid return passage 24 downstream of the flowmeter unit 20 and bypass outlet 40. In some embodiments, fluid is directed to one of the pair of cooling parts 18A by the device inlet 14 and the device outlet 16 and fluid is directed to the other of the pair of cooling parts 18A by the secondary device inlet 114 and the secondary device outlet 116.

The secondary flowmeter unit 120 includes a secondary supply outlet 121 and a secondary supply inlet 126 on the secondary fluid supply passage 122. The secondary supply outlet 121 connects to the secondary device inlet 114 of the device 12 by the secondary fluid supply passage 122 downstream of the secondary flowmeter unit 120. The secondary supply inlet 126 connects the secondary fluid supply passage 122 downstream of the secondary flowmeter unit 120. The secondary supply inlet 126 is connected to the fluid supply 30 by the secondary fluid supply passage 122 and the fluid supply passage 22.

The secondary flowmeter unit 120 includes a secondary return inlet 125 and a secondary return outlet 132 on the secondary fluid return passage 124. The secondary return inlet 125 connects to the secondary device outlet 116 of the device 12 through the secondary fluid return passage 124 upstream of the secondary flowmeter unit 120. The secondary return outlet 132 connects to the fluid return 34 through the secondary fluid return passage 124 downstream of the secondary flowmeter unit 120 and the fluid return passage 24.

In some other embodiments, the secondary device inlet 114 and the secondary device outlet 116 are provided on a secondary device 112 having a cooling part 118. The secondary fluid supply passage 122 extends from the fluid supply passage 22, upstream of the flowmeter unit 20, the shutoff valve 28 and the bypass inlet 38, to a secondary device inlet 114 of the secondary device 112. The secondary fluid return passage 124 extends from a secondary device outlet 116 of the secondary device 112 to the fluid return passage 24 downstream of the flowmeter unit 20 and bypass outlet 40.

The secondary flowmeter unit 120 is configured to detect differences in flow between the fluid flowing through the secondary fluid supply passage 122 and the secondary fluid return passage 124. Specifically, a secondary supply flowmeter 120A is provided between the secondary supply outlet 121 and a secondary supply inlet 126 and a secondary return flowmeter 120B is provided between the secondary return inlet 125 and a secondary return outlet 132. As described in greater detail above, the secondary flowmeter unit 120 detects leaks from cap loss, hose burst, or inadvertent shutoff and outputs a leak signal upon the detection of a leak similarly to the flowmeter unit 20.

The secondary shutoff valve 128 is positioned on the secondary fluid supply passage 122 upstream of the secondary flowmeter unit 120. Specifically, the secondary shutoff valve 128 is provided on the secondary fluid supply passage 122 upstream of the secondary supply inlet 126. The secondary shutoff valve 128 is switchable between a normally open position and a closed position. In the normally open position the secondary shutoff valve 128 allows fluid from the secondary fluid supply passage 122 to flow into the secondary supply inlet 126. In the closed position the secondary shutoff valve 128 prevents fluid flowing from the secondary fluid supply passage 122 through the secondary shutoff valve 128 to the secondary supply inlet 126.

The secondary conduit 146 extends between a secondary drawback opening 154 formed on the secondary fluid supply passage 122 and the dual orifice venturi valve 144. The secondary drawback opening 154 is provided on the secondary fluid supply passage 122 downstream of the secondary flowmeter unit 120. Specifically, the secondary drawback opening 154 is positioned on the secondary fluid supply passage 122 between the secondary supply outlet 121 and the secondary device inlet 114.

The dual orifice venturi valve 144 is positioned on the bypass passage 36 between the bypass inlet 38 and the bypass valve 42. The primary orifice 152A of the dual orifice venturi valve 144 is connected to the drawback opening 54 by the conduit 46 and the secondary orifice 152B of the dual orifice venturi valve 144 is connected to the secondary drawback opening 154 by the secondary conduit 146.

In some embodiments, the conduit 46 include a junction, similar to the junction 55 of FIG. 1 to connect the conduit 46 to the drawback opening 54 on the fluid supply passage 22 and a drawback opening on the fluid return passage 24. In some embodiments, the secondary conduit 146 include a junction, similar to the junction 55 of FIG. 1, to connect the secondary conduit 146 to the secondary drawback opening 154 on the secondary fluid supply passage 122 and a drawback opening on the secondary fluid return passage 124. In some other embodiments, both the conduit 46 and the secondary conduit 146 include junctions, similar to the junction 55 of FIG. 1, to connect the conduit 46 to the drawback opening 54 on the fluid supply passage 22 and a drawback opening on the fluid return passage 24 to connect the secondary conduit 146 to the drawback 154 on the secondary fluid supply passage 122 and a drawback opening on the secondary fluid return passage 124

In some embodiments, the conduit 46 includes a check valve positioned between the drawback opening 54 and the primary orifice 152A of the dual orifice venturi valve 144. In some embodiments, the secondary conduit 146 includes a check valve positioned between the secondary drawback opening 154 and the secondary orifice 152B of the dual orifice venturi valve 144. In some other embodiments, the conduit 46 includes a check valve positioned between the junction and the primary orifice 152A and the secondary conduit 146 includes a check valve positioned between the junction and the secondary orifice 152B.

In some embodiments, the venturi vacuum drawback assembly 110 includes a primary conduit valve 80 and a secondary conduit valve 180. The primary conduit valve 80 is positioned on the conduit 46 between the drawback opening 54 and the primary orifice 152A. The primary conduit valve 80 is movable between a normally closed position, which prevents the flow of fluid through the primary conduit valve 80, and an open position, which permits the flow of fluid through the primary conduit valve 80. The secondary conduit valve 180 is positioned on the secondary conduit 146 between the secondary drawback opening 154 and the secondary orifice 152B. The secondary conduit valve 180 is movable between a normally closed position, which prevents the flow of fluid through the secondary conduit valve 180, and an open position, which permits the flow of fluid through the secondary conduit valve 180.

The electronic control unit 70 is electronically connected to secondary flowmeter unit 120 similar to the flowmeter unit 20. The electronic control unit 70 is also electronically connected to the shutoff valve 28, the secondary shutoff valve 128, the bypass valve 42, the primary conduit valve 80, and the secondary conduit valve 180. Specifically, the electronic control unit 70 is configured to control the operation of the shutoff valve 28 between the normally open position and the closed position. The electronic control unit 70 is further configured to control the operation of the bypass valve 42 between the normally closed position and the open position. The electronic control unit 70 is configured to control the operation of the secondary shutoff valve 128 between the normally open position and the closed position. The electronic control unit 70 is further configured to control the operation of the primary conduit valve 80 and the secondary conduit valve 180 between the normally closed position and the open position. In some embodiments, the shutoff valve 28, the secondary shutoff valve 128, the bypass valve 42, the primary conduit valve 80, and the secondary conduit valve 180 are electronically controlled solenoid valves that are controlled by the electronic control unit 70.

The detection logic 74A is executed by the processor 72 to detect one or more signals output from the supply flowmeter 20A, the return flowmeter 20B, the secondary supply flowmeter 120A, and the secondary return flowmeter 120B. For example, the detection logic 74A is configured to cause the processor 72 to determine a presence or absence of a leak in the coolant delivery system 101, specifically, a leak in at least one of the fluid supply passage 22, the device 12, including device inlet 14 and the device outlet 16, and the fluid return passage 24 based on the signals output from at least one of the supply flowmeter 20A and the return flowmeter 20B. Specifically, processor 72 determines the presence or absence of the leak based on output signals from the supply flowmeter 20A and the return flowmeter 20B that indicate the flowrates of the fluid supply passage 22 and the fluid return passage 24, respectively.

Further, the detection logic 74A is configured to cause the processor 72 to determine a presence or absence of a leak in at least one of the secondary fluid supply passage 122, the secondary device inlet 114, the secondary device outlet 116, and the secondary fluid return passage 124 based on the signals output from at least one of the secondary supply flowmeter 120A and the secondary return flowmeter 120B. Specifically, processor 72 determines the presence or absence of the leak based on output signals from the secondary supply flowmeter 120A and the secondary return flowmeter 120B that indicate the flowrates of the secondary fluid supply passage 122 and the secondary fluid return passage 124, respectively.

The control logic 74B is executed by the processor 72 to control operation of the shutoff valve 28, the secondary shutoff valve 128, and the bypass valve 42 based on the determination of the presence or absence of a leak in the coolant delivery system 101. In some embodiments, when the processor 72 has determined the absence of a leak, the control logic 74B maintains the shutoff valve 28 in the normally open position, the secondary shutoff valve 128 in the normally open position, and the bypass valve 42 in the normally closed position.

In order to facilitate a better understanding of the venturi vacuum drawback assembly 110, a discussion of the operation of the venturi vacuum drawback assembly 110 will be provided. During operation in which the processor 72 determines the absence of a leak, the coolant delivery system 101 operates to deliver fluid from the fluid supply 30 to the device 12 through the fluid supply passage 22 and the secondary fluid supply passage 122 and returns the fluid from the device 12 through the fluid return passage 24 and the secondary fluid return passage 124 to the recirculation device connected to the fluid return 34. Specifically, during such operation, the shutoff valve 28 is in the normally open position, the secondary shutoff valve 128 is in the normally open position, and the bypass valve 42 is in the normally closed position. As fluid flows through the fluid supply passage 22, the fluid is prevented from flowing through the bypass passage 36 as the bypass valve 42 is in the normally closed position.

During operation in which the processor 72 determines the presence of a leak, the venturi vacuum drawback assembly 110 operates to control the flow of fluid from the device 12. Specifically, upon the processor 72 determining the presence of a leak based on the one or more signals output from the supply flowmeter 20A, the return flowmeter 20B, the secondary supply flowmeter 120A, and the secondary return flowmeter 120B and detected by the detection logic 74A, the control logic 74B is executed by the processor 72 to control the shutoff valve 28 from the normally open position to the closed position, to control the secondary shutoff valve 128 from the normally open position to the closed position, and to control the bypass valve 42 from the normally closed position to the open position.

In some embodiments, the processor 72 executes the control logic 74B to switch the bypass valve 42 from the normally closed position to the open position simultaneously with the switching of the shutoff valve 28 and the secondary shutoff valve 128 from the normally open position to the closed position. In some embodiments, the processor 72 executes the control logic 74B to switch the bypass valve 42 from the normally closed position to the open position after an elapse of a preset time period after switching of the shutoff valve 28 and the secondary shutoff valve 128 from the normally open position to the closed position.

In the closed position, the shutoff valve 28 prevents fluid from flowing from the fluid supply 30 through the shutoff valve 28 to the device 12, and the secondary shutoff valve 128 prevents fluid from flowing from the secondary fluid supply passage 122 through the secondary shutoff valve 128 to the device. As fluid is prevented from flowing in the fluid supply passage 22, downstream of the shutoff valve 28, and fluid is prevented from flowing in the secondary fluid supply passage 122, downstream of the secondary shutoff valve 128, additional fluid is prevented from being discharged through the leak. As the bypass valve 42 is in the open position, fluid is permitted to flow through the bypass passage 36 from the bypass inlet 38 on the fluid supply passage 22 upstream of the shutoff valve 28 to the bypass outlet 40 on the fluid return passage 24 downstream of the return outlet 32.

As such, fluid flows through the bypass passage 36 including the dual orifice venturi valve 144. Due to the venturi effect of the dual orifice venturi valve 144, a pressure in the dual orifice venturi valve 144 upstream of the primary orifice 152A and the secondary orifice 152B is higher than the pressure downstream of the primary orifice 152A and the secondary orifice 152B due to the decrease in cross-sectional area at the constricted portion 60. Accordingly, the fluid remaining in the fluid supply passage 22 downstream of the shutoff valve 28 is at a higher pressure than the pressure at the primary orifice 152A and the fluid moves from the area of high pressure to the area of low pressure to drain the fluid that remains in the fluid supply passage 22 through the venturi valve 44 so as to exit through the fluid return passage 24. Further, the fluid remaining in the secondary fluid supply passage 122 downstream of the secondary shutoff valve 128 is at a higher pressure than the pressure at the secondary orifice 152B and the fluid moves from the area of high pressure to the area of low pressure to drain the fluid that remains in the secondary fluid supply passage 122 through the dual orifice venturi valve 144 so as to exit through the fluid return passage 24.

As such, the decrease in pressure creates a vacuum at the primary orifice 152A which allows the fluid that remains in the fluid supply passage 22 downstream of the shutoff valve 28 to be drawn through drawback opening 54 and into the primary orifice 52 via the conduit 46. Fluid drawn through the primary orifice 52 exits the venturi valve 44 via the venturi outlet 50 and enters the fluid return passage 24 via the bypass outlet 40. The decrease in pressure creates a vacuum at the secondary orifice 152B which allows the fluid that remains in the secondary fluid supply passage 122 downstream of the secondary shutoff valve 128 to be drawn through secondary drawback opening 154 and into the secondary orifice 152B via the secondary conduit 146. Fluid drawn through the secondary orifice 152B exits the dual orifice venturi valve 144 via the venturi outlet 50 and enters the fluid return passage 24 via the bypass outlet 40. Therefore, the remaining fluid in the fluid supply passage 22 downstream of the shutoff valve 28 and the remaining fluid in the secondary fluid supply passage 122 downstream of the secondary shutoff valve 128 will not discharge through the leak due to the vacuum effect of the dual orifice venturi valve 144.

In some embodiments, the dual orifice venturi valve 144 not only draws back the fluid in the fluid supply passage 22 and the secondary fluid supply passage 122 but any fluid in the device 12 and/or the fluid return passage 24 and the secondary fluid return passage 124 that is downstream of the leak.

In some embodiments, the detection logic 74A is configured to cause the processor 72 to determine a presence or absence of a leak in the fluid supply passage 22, the fluid return passage 24, and the device 12 based on the signals output from at least one of the supply flowmeter 20A and the return flowmeter 20B or a leak in the secondary fluid supply passage 122, the device 12 (or the secondary device 112), and the secondary fluid return passage 124 based on the signals output from at least one of the secondary supply flowmeter 120A and the secondary return flowmeter 120B.

In a situation in which the processor 72 determines the presence of a leak in one of the fluid supply passage 22, the fluid return passage 24, the cooling part 18, the device inlet 14, or the device outlet 16, based on output signals from the supply flowmeter 20A and the return flowmeter 20B, and determines the absence of a leak in the secondary fluid supply passage 122, the secondary fluid return passage 124, the secondary cooling part 118, the secondary device inlet 114, or the secondary device outlet 116, based on output signals from the secondary supply flowmeter 120A and the secondary return flowmeter 120B, the control logic 74B is executed by the processor 72 to control operation of the shutoff valve 28 to switch from the normally open position to the closed position, the bypass valve 42 from the normally closed position to the open position, and the primary conduit valve 80 from the normally closed position to the open position while maintaining the secondary shutoff valve 128 in the normally open position and the secondary conduit valve 180 in the normally closed position.

Accordingly, fluid flows through the bypass passage 36 including the dual orifice venturi valve 144. Due to the venturi effect of the dual orifice venturi valve 144, a pressure in the dual orifice venturi valve 144 upstream of the primary orifice 152A and the secondary orifice 152B is higher than the pressure downstream of the primary orifice 152A and the secondary orifice 152B due to the decrease in cross-sectional area at the constricted portion 160. As the fluid remaining in the fluid supply passage 22 downstream of the shutoff valve 28 is at a higher pressure than the pressure at the primary orifice 152A and the fluid moves from the area of high pressure to the area of low pressure to drain the fluid that remains in the fluid supply passage 22 through the venturi valve 44 so as to exit through the fluid return passage 24. Specifically, the fluid remaining in the fluid supply passage 22 downstream of the shutoff valve 28 flows from the drawback opening 54 through the primary conduit valve 80 in the open position and into the primary orifice 152A of the dual orifice venturi valve 144.

However, as the secondary conduit valve 180 is in the normally closed position fluid is prevented from flowing through the secondary conduit valve 180 into the secondary orifice 152B. Further, as the secondary shutoff valve 128 is in the normally open position fluid from the fluid supply 30 passes through the fluid supply passage 22 into the secondary fluid supply passage 122 and through the secondary shutoff valve 128, in the normally open position, to the secondary device inlet 114. Accordingly, fluid is prevented from passing through the shutoff valve 28 as the presence of a leak was detected by the flowmeter unit 20 and fluid is permitted to pass through the secondary shutoff valve 128 as the absence of a leak was detected by the secondary flowmeter unit 120.

In a situation in which the processor 72 determines the absence of a leak in one of the fluid supply passage 22, the fluid return passage 24, the cooling part 18, the device inlet 14, or the device outlet 16, based on output signals from the supply flowmeter 20A and the return flowmeter 20B, and determines the presence of a leak in the secondary fluid supply passage 122, the secondary fluid return passage 124, the secondary cooling part 118, the secondary device inlet 114, or the secondary device outlet 116, based on output signals from the secondary supply flowmeter 120A and the secondary return flowmeter 120B, the control logic 74B is executed by the processor 72 to control operation of the secondary shutoff valve 128 to switch from the normally open position to the closed position, the bypass valve 42 from the normally closed position to the open position, and the secondary conduit valve 180 from the normally closed position to the open position while maintaining the shutoff valve 28 in the normally open position and the primary conduit valve 80 in the normally closed position.

Accordingly, fluid flows through the bypass passage 36 including the dual orifice venturi valve 144. Due to the venturi effect of the dual orifice venturi valve 144, a pressure in the dual orifice venturi valve 144 upstream of the primary orifice 152A and the secondary orifice 152B is higher than the pressure downstream of the primary orifice 152A and the secondary orifice 152B due to the decrease in cross-sectional area at the constricted portion 160. As the fluid remaining in the secondary fluid supply passage 122 downstream of the secondary shutoff valve 128 is at a higher pressure than the pressure at the secondary orifice 152B, the fluid moves from the area of high pressure to the area of low pressure to drain the fluid that remains in the secondary fluid supply passage 122 through the dual orifice venturi valve 144 so as to exit through the fluid return passage 24. Specifically, the fluid remaining in the secondary fluid supply passage 122 downstream of the secondary shutoff valve 128 flows from the secondary drawback opening 154 through the secondary conduit valve 180 in the open position and into the secondary orifice 152B of the dual orifice venturi valve 144. The fluid then exits the bypass passage 36 through the bypass outlet 40 and into the fluid return passage 24.

However, as the primary conduit valve 80 is in the normally closed position fluid is prevented from flowing through the primary conduit valve 80 of the conduit 46 into the primary orifice 152A. Further, as the shutoff valve 28 is in the normally open position fluid from the fluid supply 30 passes through the fluid supply passage 22 through the shutoff valve 28 in the normally open position to the device inlet 14. Accordingly, fluid is prevented from passing through the secondary shutoff valve 128 as the presence of a leak was detected by the secondary flowmeter unit 120 and fluid is permitted to pass through the shutoff valve 28 as the absence of a leak was detected by the flowmeter unit 20.

It is appreciated, that the control logic 74B may include an electronic control start time logic and control stop time logic that when executed by the processor 72 switches the bypass valve 42 from the open position to the normally closed position after a lapse of a predetermined time from the switch of the bypass valve 42 from the normally closed position to the open position.

In addition, the venturi vacuum drawback assembly 10 and the venturi vacuum drawback assembly 110 are optionally used to remove fluid remaining in the fluid supply passage 22 and the secondary fluid supply passage 122, downstream of the shutoff valve 28 and the secondary shutoff valve 128, when at least one of the shutoff valve 28 and the secondary shutoff valve 128 are in the closed position to shut off the supply of fluid to the device 12 and/or the secondary device 112 during maintenance of the device 12 and/or the secondary device 112. For example, when replacing cooling parts 18A, such as welding tips of a robotic welding device, the shutoff valve 28 is in the closed position to shut off the flow of fluid to the device 12 and the bypass valve 42 is in the open position to drain the remaining fluid to inhibit the remaining fluid from discharging during replacement of the welding tips 18A. Similarly, when replacing cooling parts 18A, such as welding tips of a robotic welding device, the secondary shutoff valve 128 is in the closed position to shut off the flow of fluid to the secondary device 112 and the bypass valve 42 is in the open position to drain the remaining fluid to inhibit the remaining fluid from discharging during replacement of the cooling parts 118A, such as welding tips of a secondary robotic welding device.

However, the use of the venturi vacuum drawback assembly 10, the venturi vacuum drawback assembly 10', and the venturi vacuum drawback assembly 110 are not limited thereto. It is appreciated, of course, that the venturi vacuum drawback assembly 10, the venturi vacuum drawback assembly 10', and the venturi vacuum drawback assembly 110 are applicable in various other types of recirculating and non-recirculating coolant systems illustratively including internal combustion engines, lasers, battery systems, computer system, and other electronic or mechanical components that requires cooling. Moreover, the venturi vacuum drawback assembly 10, the venturi vacuum drawback assembly 10', and the venturi vacuum drawback assembly 110 are applicable in various other environments illustratively including, but not limited to, fluid transfer systems used in manufacturing or agriculture. In such fluid transfer systems, the venturi vacuum drawback assembly 10, the venturi vacuum drawback assembly 10', and the venturi vacuum drawback assembly 110 are utilized to direct the flow of fluid through the venturi effect caused by the venturi valve 44 and the dual orifice venturi valve 144, respectively.

It is appreciated, that the venturi vacuum drawback assembly 10 of FIG. 1 includes the conduit valve 80 positioned between the primary orifice 52 and the junction 55 and that the venturi vacuum drawback assembly 10' of FIG. 3 includes the primary conduit valve 80 provided on the supply conduit 46A between the primary orifice 152A and the drawback opening 54A and includes the secondary valve 180 provided on the return conduit 46B between the secondary orifice 152B and the drawback opening 54B.

It is appreciated, that the fluid controlled by the venturi vacuum drawback assembly 10, the venturi vacuum drawback assembly 10', and the venturi vacuum drawback assembly 110 is a cooling fluid such as a coolant including water based coolants and/or natural or synthetic oil based coolants.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. It is therefore intended that the appended claims cover all such changes and modifications that are within the scope of the embodiments shown and described herein.

It is claimed:

1. A venturi vacuum drawback assembly for controlling a flow of a fluid from a device, the venturi vacuum drawback assembly comprising:
    a fluid supply passage that supplies the fluid to the device;
    a fluid return passage that returns the fluid from the device;
    a shutoff valve positioned on the fluid supply passage;
    a bypass passage includes an inlet and an outlet, the inlet connected to the fluid supply passage upstream of the shutoff valve, and the outlet connected to the fluid return passage;
    a bypass valve positioned on the bypass passage; and
    a venturi valve positioned on the bypass passage upstream of the bypass valve, the venturi valve includes a venturi inlet, a venturi outlet, and a primary orifice positioned between the venturi inlet and the venturi outlet, the primary orifice is connected to a drawback opening on the fluid supply passage by a conduit, the drawback opening of the fluid supply passage is positioned downstream of the shutoff valve.

2. The venturi vacuum drawback assembly of claim 1, wherein the venturi valve includes a constricted portion at which the primary orifice is located, the venturi inlet has an inlet orifice at the constricted portion, the venturi outlet has an outlet orifice at the constricted portion, wherein an area of the outlet orifice is equal to or less than a sum of an area of the primary orifice and an area of the inlet orifice.

3. The venturi vacuum drawback assembly of claim 1, wherein the shutoff valve is switchable between a normally open position and a closed position, in the normally open position fluid is permitted to flow through the shutoff valve to the device, and in the closed position fluid is inhibited from flowing through the shutoff valve.

4. The venturi vacuum drawback assembly of claim 3, wherein the bypass valve is movable between a normally closed position and an open position, in the normally closed position fluid flowing from the fluid supply passage is inhibited from flowing through the bypass valve to the fluid return passage, in the open position fluid flowing from the fluid supply passage is permitted to flow through the bypass valve to the fluid return passage.

5. The venturi vacuum drawback assembly of claim 4, wherein upon movement of the shutoff valve from the normally open position to the normally closed position and movement of the bypass valve from the normally closed position to the open position, fluid flowing from the fluid supply passage passes through the bypass passage to create a vacuum at the primary orifice of the venturi valve that draws fluid remaining in the fluid supply passage downstream of the shutoff valve through the drawback opening in the fluid supply passage, and the conduit such that the fluid exits the venturi outlet into the fluid return passage through the outlet of the bypass passage.

6. The venturi vacuum drawback assembly of claim 1 further comprising a flowmeter unit configured to control the shutoff valve and the bypass valve, the flowmeter unit is positioned on at least one of the fluid supply passage and the fluid return passage, the flowmeter unit configured to detect a leak in at least one of the fluid supply passage and the fluid return passage.

7. The venturi vacuum drawback assembly of claim 6, wherein the shutoff valve is switchable between a normally open position and a closed position, in the normally open position fluid is permitted to flow through the shutoff valve to the device, and in the closed position fluid is inhibited from flowing through the shutoff valve, and
    wherein the bypass valve is movable between a normally closed position and an open position, in the normally closed position fluid flowing from the fluid supply passage is inhibited from flowing through the bypass valve to the fluid return passage, in the open position fluid flowing from the fluid supply passage is permitted to flow through the bypass valve to the fluid return passage.

8. The venturi vacuum drawback assembly of claim 7, wherein upon detection of a leak by the flowmeter unit the flowmeter unit controls the shutoff valve from the normally open position to the closed position inhibit the supply of fluid to the device and the flowmeter unit controls the bypass valve from the normally closed position to the open position, and
    wherein upon movement of the shutoff valve from the normally open position to the normally closed position and movement of the bypass valve from the normally closed position to the open position, fluid flowing from the fluid supply passage passes through the bypass passage to create a vacuum at the primary orifice of the venturi valve that draws fluid remaining in the fluid supply passage downstream of the shutoff valve through the drawback opening in the fluid supply passage, and the conduit such that the fluid exits the venturi outlet into the fluid return passage through the outlet of the bypass passage.

9. A venturi vacuum drawback assembly for controlling a flow of a fluid from a device, the venturi vacuum drawback assembly comprising:
    a primary fluid supply passage that supplies the fluid to the device;
    a primary fluid return passage that returns the fluid from the device;

a primary shutoff valve positioned on the primary fluid supply passage;

a secondary fluid supply passage that supplies the fluid to the device;

a secondary fluid return passage that returns the fluid from the device;

a secondary shutoff valve positioned on the secondary fluid supply passage;

a bypass passage includes an inlet and an outlet, the inlet connected to the primary fluid supply passage upstream of the primary shutoff valve, and the outlet connected to the primary fluid return passage;

a bypass valve positioned on the bypass passage; and a venturi valve positioned on the bypass passage upstream of the bypass valve, the venturi valve includes a venturi inlet, a venturi outlet, a primary orifice positioned between the venturi inlet and the venturi outlet, and a secondary orifice positioned between the venturi inlet and the venturi outlet, the primary orifice is connected to a primary drawback opening on the primary fluid supply passage by a primary conduit, the primary drawback opening of the primary fluid supply passage is positioned downstream of the primary shutoff valve, the secondary orifice is connected to a secondary drawback opening on the secondary fluid supply passage by a secondary conduit, the secondary drawback opening of the secondary fluid supply passage is positioned downstream of the secondary shutoff valve.

10. The venturi vacuum drawback assembly of claim 9, wherein the venturi valve includes a constricted portion at which the primary orifice and the secondary orifice are located, the venturi inlet has an inlet orifice at the constricted portion, the venturi outlet has an outlet orifice at the constricted portion, wherein an area of the outlet orifice is equal to or less than a sum of an area of the primary orifice, an area of the secondary orifice, and an area of the inlet orifice.

11. The venturi vacuum drawback assembly of claim 9, wherein the primary shutoff valve is switchable between a normally open position and a closed position, in the normally open position fluid is permitted to flow through the primary shutoff valve to the device, and in the closed position fluid is inhibited from flowing through the primary shutoff valve, and wherein the secondary shutoff valve is switchable between a normally open position and a closed position, in the normally open position fluid is permitted to flow through the secondary shutoff valve to the device, and in the closed position fluid is inhibited from flowing through the secondary shutoff valve.

12. The venturi vacuum drawback assembly of claim 11, wherein the bypass valve is movable between a normally closed position and an open position, in the normally closed position fluid flowing from the primary fluid supply passage is inhibited from flowing through the bypass valve to the primary fluid return passage, in the open position fluid flowing from the primary fluid supply passage is permitted to flow through the bypass valve to the primary fluid return passage.

13. The venturi vacuum drawback assembly of claim 12, wherein upon movement of the primary shutoff valve from the normally open position to the normally closed position, movement of the secondary shutoff valve from the normally open position to the normally closed position, and movement of the bypass valve from the normally closed position to the open position, fluid flowing from the primary fluid supply passage passes through the bypass passage to create a vacuum at the primary orifice of the venturi valve that draws fluid remaining in the primary fluid supply passage downstream of the primary shutoff valve through the primary drawback opening in the primary fluid supply passage, and the primary conduit such that the fluid exits the venturi outlet into the primary fluid return passage through the outlet of the bypass passage, and fluid flowing from the primary fluid supply passage passes through the bypass passage to create a vacuum at the secondary orifice of the venturi valve that draws fluid remaining in the secondary fluid supply passage downstream of the secondary shutoff valve through the secondary drawback opening in the secondary fluid supply passage, and the secondary conduit such that the fluid exits the venturi outlet into the primary fluid return passage through the outlet of the bypass passage.

14. The venturi vacuum drawback assembly of claim 9 further comprising:

a primary flowmeter unit configured to control the primary shutoff valve, the secondary shutoff valve, and the bypass valve, the primary flowmeter unit is positioned on at least one of the primary fluid supply passage and the primary fluid return passage, the primary flowmeter unit configured to detect a leak in at least one of the primary fluid supply passage and the primary fluid return passage; and a secondary flowmeter unit configured to control the primary shutoff valve, the secondary shutoff valve and the bypass valve, the secondary flowmeter unit is positioned on at least one of the secondary fluid supply passage and the secondary fluid return passage, the secondary flowmeter unit configured to detect a leak in at least one of the secondary fluid supply passage and the secondary fluid return passage.

15. The venturi vacuum drawback assembly of claim 14, wherein the primary shutoff valve is switchable between a normally open position and a closed position, in the normally open position fluid is permitted to flow through the primary shutoff valve to the device, and in the closed position fluid is inhibited from flowing through the primary shutoff valve, and wherein the secondary shutoff valve is switchable between a normally open position and a closed position, in the normally open position fluid is permitted to flow through the secondary shutoff valve to the device, and in the closed position fluid is inhibited from flowing through the secondary shutoff valve, wherein the bypass valve is movable between a normally closed position and an open position, in the normally closed position fluid flowing from the primary fluid supply passage is inhibited from flowing through the bypass valve to the primary fluid return passage, in the open position fluid flowing from the primary fluid supply passage is permitted to flow through the bypass valve to the primary fluid return passage.

16. The venturi vacuum drawback assembly of claim 15, wherein upon detection of a leak by the primary flowmeter unit, the primary flowmeter unit controls the primary shutoff valve from the normally open position to the closed position to inhibit the supply of fluid from the primary fluid supply passage to the device, the primary flowmeter unit controls the secondary shutoff valve from the normally open position to the closed position to inhibit the supply of fluid from the secondary fluid supply passage to the device, and the primary flowmeter unit controls the bypass valve from the normally closed position to the open position, and wherein upon movement of the primary shutoff valve from the normally open position to the normally closed position and movement of the bypass valve from the normally closed position to the open position, fluid flowing from the primary fluid supply passage passes through the bypass passage to create a vacuum at the primary orifice of the venturi valve that draws fluid remaining in the primary fluid supply passage downstream of the primary shutoff valve through the primary drawback opening in the primary fluid supply passage, and the primary conduit such that the fluid exits the venturi outlet into the primary fluid return passage through the outlet of the bypass passage.

17. The venturi vacuum drawback assembly of claim 15, wherein upon detection of a leak by the secondary flowmeter unit, the secondary flowmeter unit controls the primary shutoff valve from the normally open position to the closed position to inhibit the supply of fluid from the primary fluid supply passage to the device, the secondary flowmeter unit controls the secondary shutoff valve from the normally open position to the closed position to inhibit the supply of fluid from the secondary fluid supply passage to the device, and the secondary flowmeter unit controls the bypass valve from the normally closed position to the open position, and wherein upon movement of the primary shutoff valve from the normally open position to the normally closed position and movement of the bypass valve from the normally closed position to the open position, fluid flowing from the primary fluid supply passage passes through the bypass passage to create a vacuum at the secondary orifice of the venturi valve that draws fluid remaining in the secondary fluid supply passage downstream of the secondary shutoff valve through the secondary drawback opening in the secondary fluid supply passage, and the secondary conduit such that the fluid exits the venturi outlet into the primary fluid return passage through the outlet of the bypass passage.

18. A dual orifice venturi valve assembly comprising:

a venturi valve that includes a venturi inlet, a venturi outlet, a first constricted portion, and a second constricted portion, the first constricted portion and the second constricted portion are positioned between the venturi inlet and the venturi outlet, the first constricted portion includes a primary orifice and a secondary orifice, the first constricted portion includes an inlet orifice having an inlet diameter at a junction between the first constricted portion and the second constricted portion, the first constricted portion includes an outlet orifice having an outlet diameter that is greater than the inlet diameter, wherein an area of the outlet orifice is equal to or less than a sum of an area of the inlet orifice, an area of the primary orifice, and an area of the secondary orifice diameter.

19. The dual orifice venturi valve assembly of claim 18, wherein the first constricted portion is generally cylindrically shaped having the outlet diameter and the second constricted portion is generally cylindrically shaped having the inlet diameter.

20. The dual orifice venturi valve assembly of claim 18, wherein fluid flows from the venturi inlet towards the venturi outlet in a flow direction, fluid flows through the primary orifice in a first direction, and fluid flows through the secondary orifice in a second direction, wherein the first direction and the second direction are generally perpendicular to the flow direction, and the first direction is generally perpendicular to the second direction.

* * * * *